United States Patent
Jindal

(10) Patent No.: US 7,130,660 B2
(45) Date of Patent: Oct. 31, 2006

(54) METHOD AND SYSTEM FOR RECEIVING AND TRANSMITTING SIGNALS IN A CELLULAR RADIO NETWORK

(75) Inventor: Dinesh K. Jindal, Naperville, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 292 days.

(21) Appl. No.: 10/633,785

(22) Filed: Aug. 4, 2003

(65) Prior Publication Data

US 2005/0032552 A1    Feb. 10, 2005

(51) Int. Cl.
*H04M 1/00* (2006.01)
(52) U.S. Cl. .............. 455/561; 455/507; 455/445; 370/412; 370/352
(58) Field of Classification Search ............. 455/561, 455/445, 507; 370/314, 431, 412, 352
See application file for complete search history.

(56) References Cited

U.S. PATENT DOCUMENTS

2002/0049061 A1*  4/2002  Pinola ................. 455/452
2003/0161354 A1*  8/2003  Bader et al. ............. 370/537
2003/0169720 A1*  9/2003  Sebastian et al. .......... 370/342
2004/0062260 A1*  4/2004  Raetz et al. .............. 370/412
2004/0157603 A1*  8/2004  Hurtta et al. ............. 455/434
2005/0003828 A1*  1/2005  Sugar et al. ............ 455/456.1
2005/0136832 A1*  6/2005  Spreizer ................. 455/3.02

* cited by examiner

Primary Examiner—Danh C. Le

(57) ABSTRACT

A method for receiving and transmitting signals in a cellular radio network. The method comprising receiving a plurality of radio signals at different frequencies using a single radio receiver at the base station, scanning the incoming signals and saving the signals to a buffer with a first processor, reading, processing and time-multiplexing the buffered signals with a second processor, transmitting the time-multiplexed radio signal via a single physical link to a mobile switching center, demultiplexing the time-multiplexed radio signal into independent radio signals corresponding to the incoming signals at the mobile switching center with a third processor;, processing the independent radio signals with the third processor; and routing the independent radio signals to the proper end users.

10 Claims, 6 Drawing Sheets

METHOD AND SYSTEM FOR RECEIVING AND TRANSMITTING SIGNALS IN A CELLULAR RADIO NETWORK

FIELD OF THE INVENTION

The present invention relates to the field of telecommunications in general, and more particularly, to a method and system for receiving and transmitting signals in a cellular radio network.

BACKGROUND OF THE INVENTION

The demand for cellular radio service continues to grow at an astounding rate. Not surprisingly, it is becoming increasingly important that the radio spectrum be used to provide better cellular service for more and more customers with little or no extra cost to the service providers.

In cellular radio service, a predetermined radio frequency spectrum is allocated to carry the communication between a subscriber's cellular telephone and the service provider's base station, which is the gateway into the cellular switching network. The radio spectrum is divided into frequency channels, commonly referred to as "channel numbers," which are reused by base stations within a service provider's area. The greater the reuse of frequency channels, the greater the number of cellular radio subscribers that can be simultaneously served.

A major cost associated with wireless telecommunications is the base stations. The cellular approach requires a large number of base stations in a city of any size. A typical large city can have hundreds of base stations. It is very expensive to provide and maintain the numerous radio receivers that may be found within the base station itself, not to mention the numerous channel links to the mobile switching center. Presently, all cellular technologies need as many radio receivers and links at the base station as there are frequency channels available in that area (or cell), since there may be a signal coming in on all of the frequencies at the same time. Therefore, there is a need in the art to reduce the costs associated with providing cellular service.

SUMMARY OF THE INVENTION

In accordance with one aspect of the invention, a method for receiving and transmitting signals in a cellular radio network having at least one base station and a mobile switching center is provided. The method includes receiving a plurality of radio signals at different frequencies using a single receiver (radio receiver) at the base station. A fast set of processors at the base station scans all incoming frequencies and time-multiplexes them before transmitting a single time-multiplexed signal over a single link to the mobile switching center. From an implementation perspective, a single processor could accomplish the task of looping though all incoming channels, time-multiplex them, and then serialize them over a single link to the mobile switching center. However, a preferred implementation would be to use two processors. The first processor would scan incoming signals and save them to a buffer. A second processor would read these buffered signals, do the required processing of each signal and time-multiplex them before sending the resulting signal over a single link to the MSC. Regardless of the implementation, the reverse processing will be done at the mobile switching center, i.e. retrieving independent signals from the time-multiplexed signal (de-multiplexing), processing each signal and them sending to the proper destination.

In accordance with another aspect of the invention, a system for receiving and transmitting cellular radio signals in a cellular radio network is provided. The system includes a single radio receiver at a base station for receiving a plurality of radio signals at different frequencies. A first processor scans the incoming signals and saves the signals to a buffer. A second processor reads, processes and time-multiplexes the buffered signals. The base station includes means for transmitting the time-multiplexed radio signal via a physical link to a mobile switching center. The mobile switching center includes a third processor for demultiplexing the time-multiplexed radio signal into independent radio signals corresponding to the incoming signals at the mobile switching center and for processing the independent radio signals. The mobile switching center further includes means for routing the independent radio signals to the proper end users.

Still further advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, the preferred embodiments of which will be illustrated in the accompanying drawings wherein.

DETAILED DESCRIPTION OF THE INVENTION

It is understood that the specific devices and methods illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

Figure 1:
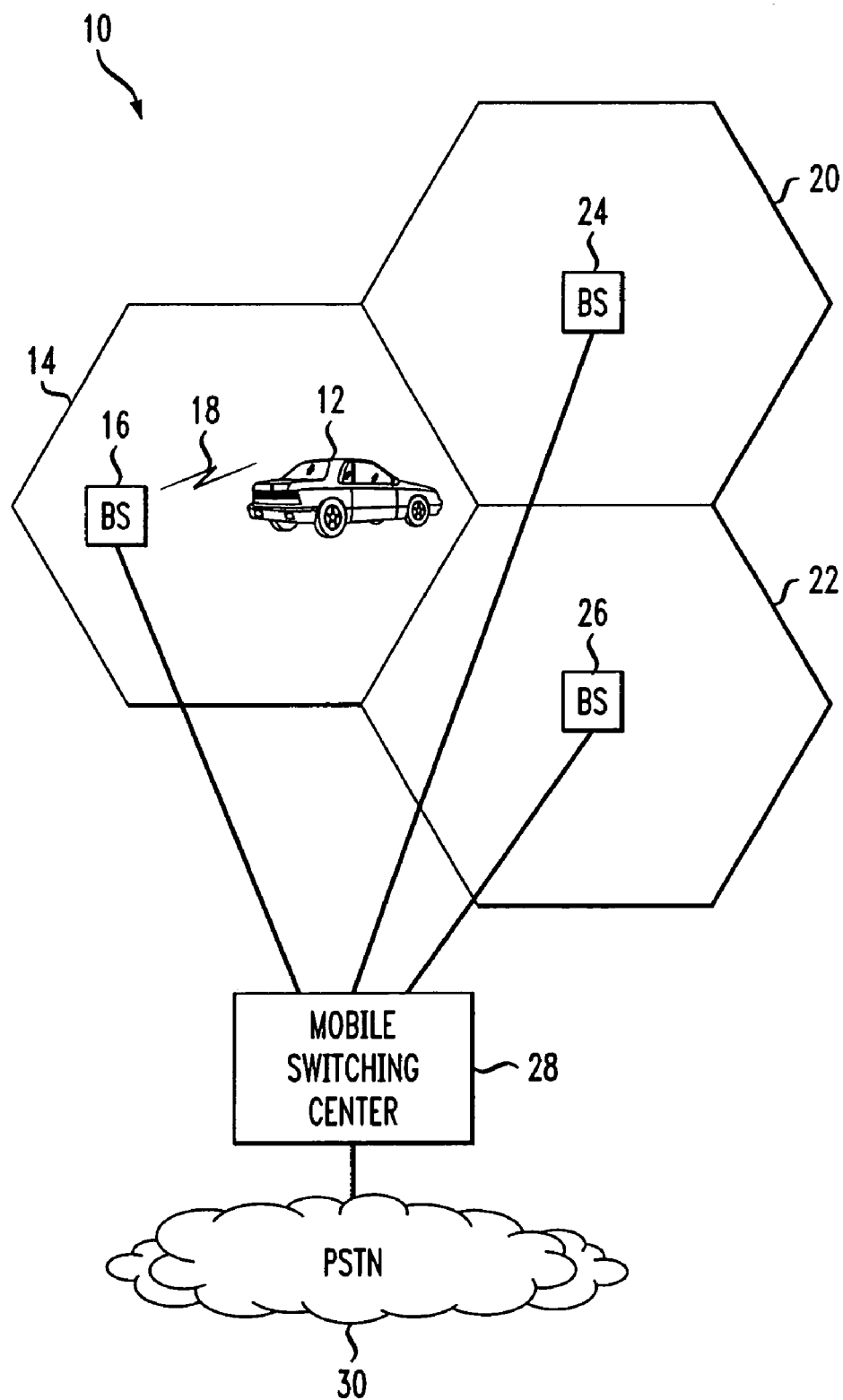
FIG. 1 is a block diagram of a cellular radio network.

FIG. 1 illustrates the principal components of a cellular radio network 10 for handling calls to and from a mobile subscriber unit 12 of which the method and system of the present invention may be implemented. It is understood that the cellular system 10 may support various types of cellular technologies, including Time Division Multiple Access (TDMA), Code Division Multiple Access (CDMA) and Global Systems for Mobile Communications (GSM). The mobile subscriber unit 12 is located within a cell 14 and is served by a base station 16. The base station 16 is generally located at the center of the cell 14. The base station 16 communicates with the mobile subscriber unit 12 over a radio channel 18, which is associated with the base station's transmit frequency (mobile subscriber unit's receive frequency) and with the mobile subscriber unit's transmit frequency (base station's receive frequency). The mobile subscriber unit 12 may, of course, move outside its current cell 14 to other cells 20 and 22. In such a case, the mobile subscriber unit 12 will be served by a corresponding base station 24 or base station 26, respectively.

As shown in FIG. 1, the base stations 16, 24, and 26 are coupled to a mobile switching center 28. It is noted that the base stations 16, 24, and 26 are shown in FIG. 1 by way of example and not by way of limitation. It is understood by those of ordinary skill in the art that the cellular network 10 may include any number of base stations. The mobile switching center 28 is coupled to and in communication with the Public Switched Telephone Network (PSTN) 30, thus providing a telephony connection between the base stations in order to complete calls between mobile subscriber unit 12 and the PSTN 30.

Thus, the cellular network 10 relies on a distributed network of cells, wherein each cell site has its own base station and uses low power to communicate with the mobile subscriber unit 12. In each cell, the same frequency sets are used as in other cells, but the cells with those same frequencies are spaced adequately apart to reduce interference. For example, in a 21-cell system, a single frequency may be used several times. One exception is CDMA-based systems, in which the same frequencies are used by every cell. Each base station, in addition, controls a mobile subscriber unit's power output, keeping it low enough to complete a circuit while not high enough to skip over to another cell.

Figure 2:
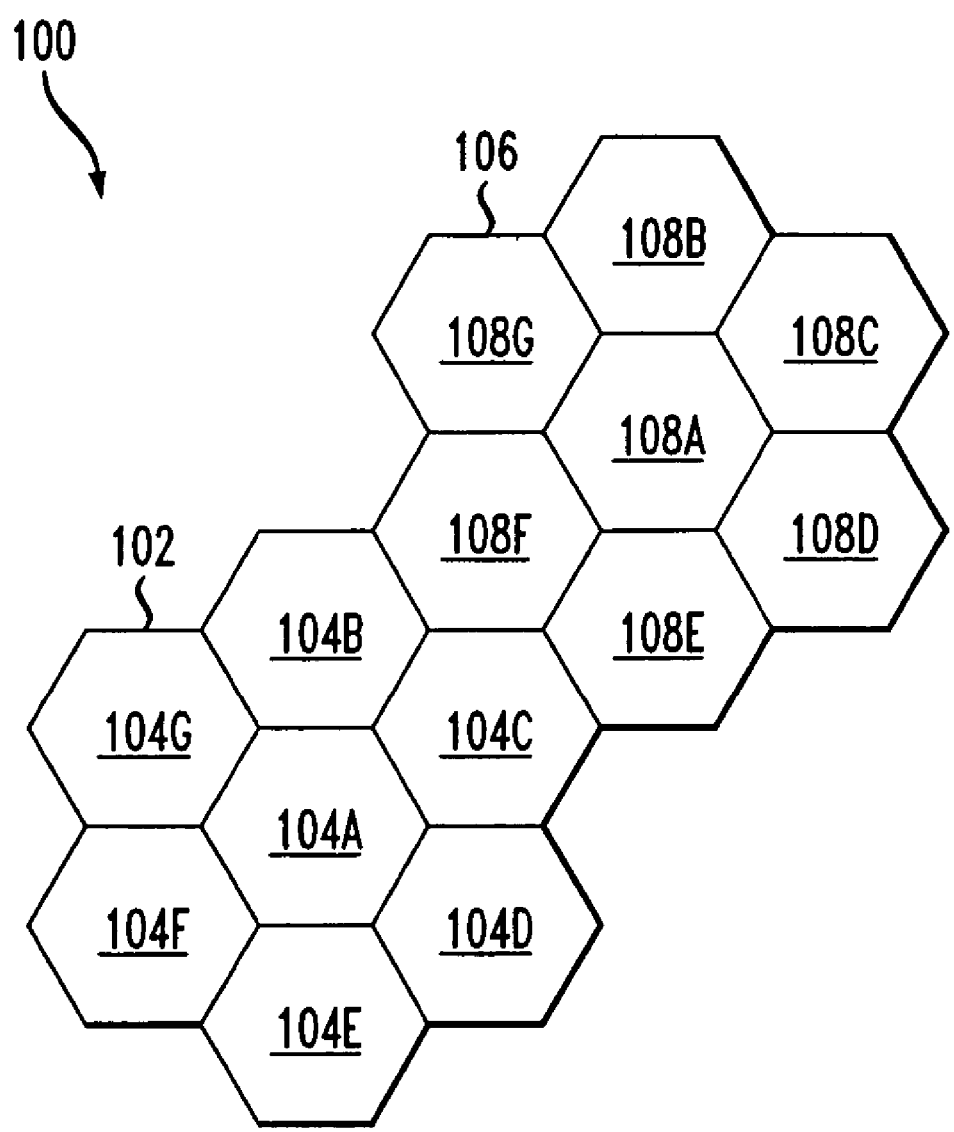
FIG. 2 is a schematic of a regular cell area layout for the cellular radio network of FIG. 1.

FIG. 2 illustrates a regular hexagonal cell layout of a cellular radio network 100 in schematic form. By depicting the geographical service area in terms of a hexagonal grid, a geometric pattern may be established, which permits frequencies to be assigned in a patterned disposition allowing the reuse of those frequencies in a controlled, repeatable regular assignment model. There are two cell clusters 102 and 106 shown, although it is understood that there may be more such clusters in the network. Each cluster 102 and 106 may contain seven individual cells 104A–104G and 108A–108G, respectively. In the network 100 shown in FIG. 2, each letter (A–G) represents a different set of channels or paired frequencies. Each channel set comprises a plurality of individual transmit and receive radio channels for use within the cell area. A cellular network separates each cell that shares the same channel set. This minimizes interference while letting the same frequencies be used in another part of the network. This concept is known in the art as frequency reuse. Note, though, that CDMA-based networks may use, in theory, all frequencies in all cells, substantially increasing capacity. A channel is a pair of frequencies, one for transmitting and one for receiving. The number of channels within a cell or within an individual sector of a cell varies greatly, depending upon many factors. Frequencies are described by their spot in the radio spectrum, such as 900 mHZ, while channels are described by numbers, such as channels 334 through 666.

Figure 3:
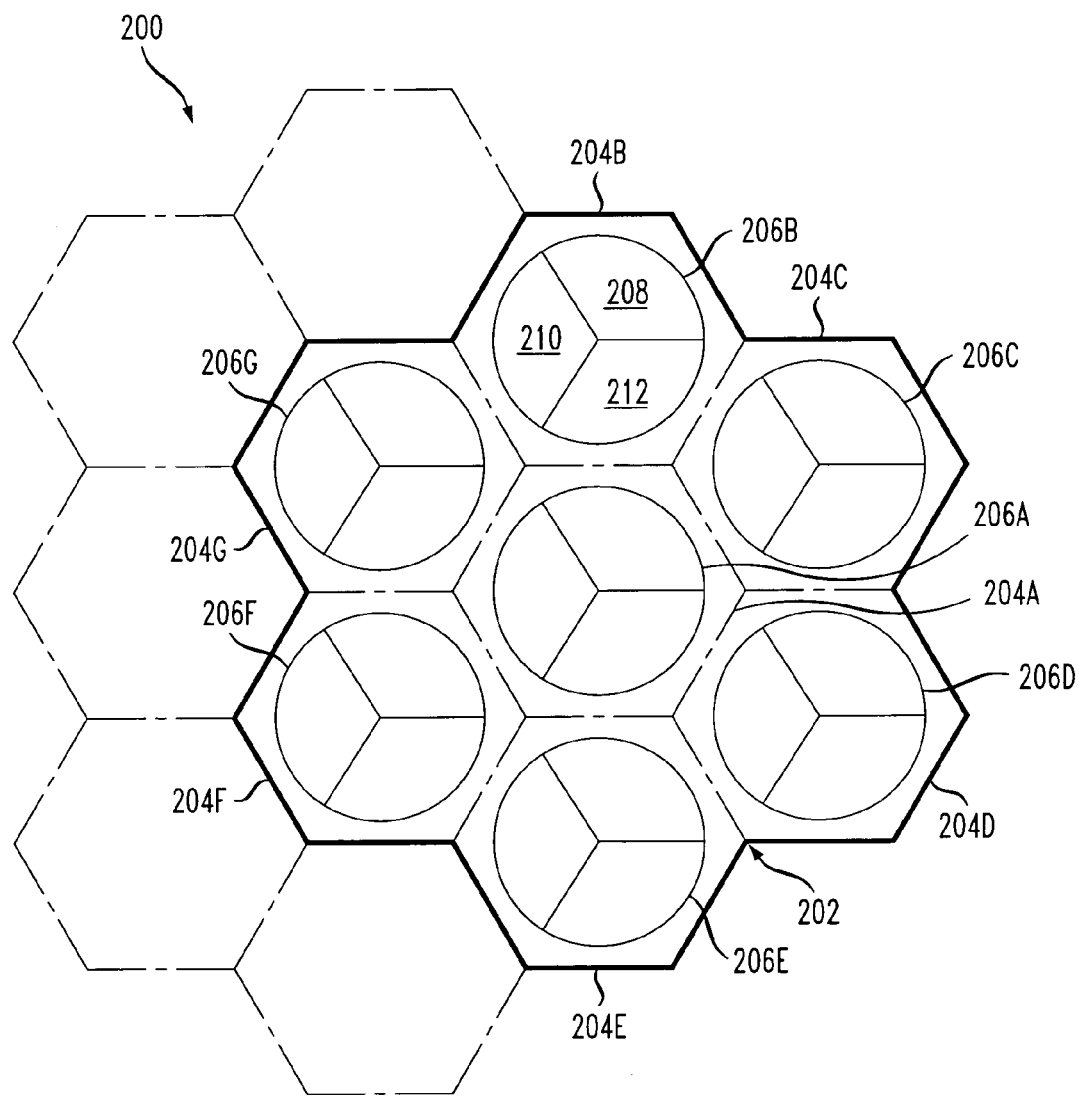
FIG. 3 is a schematic of a cell cluster for a cellular radio network having a three-sector antenna configuration and a reuse factor of seven.

FIG. 3 illustrates an example of a cell cluster 202 within a cellular radio network 200 having a three-sector antenna configuration and a frequency reuse factor of seven. The frequency reuse factor refers to the number of cells in a cluster. The service area of the cell cluster 202 is partitioned into seven cells 204A–204G. Each of the cells is served by a corresponding base station 206A–206G. Each cell 204 is configured with three antenna sectors 208, 210, 212. Each cell cluster consists of seven cells in such a configuration. Because the frequency reuse factor is seven, the frequency spectrum is reused by every cell cluster 202. Since each cell requires three channel sets, a total of twenty-one channel sets are required by cell cluster 202. Other frequency reuse factors may be employed, but a frequency reuse factor is typically seven for a three-sector antenna configuration. For an omni-directional configuration, a frequency reuse factor of thirteen is typical. In such a configuration, the radio spectrum is repeated every thirteen cells. Because each cell requires one channel set, a total of thirteen channel sets are required by a cell cluster. The cell clusters, or a portion thereof, are repeatedly deployed in order to expand cellular coverage as needed. The usable frequency spectrum is partitioned into channel sets. Each channel set contains a plurality of channel numbers, each channel number corresponds to both a transmit frequency and a receive frequency.

The FCC is responsible for allocating frequency space in the United States for all radio services. The radio channel bandwidth and reuse factors for several types of cellular radio networks are shown in Table 1 below. FDMA puts each call on a separate frequency. TDMA assigns each call a certain portion of time on a designated frequency. CDMA gives a unique code to each call and spreads it over the available frequencies.

TABLE 1

| Cellular Radio Network | Calls Per Radio Channel | Radio Channel Bandwidth | Typical Reuse Factor |
| --- | --- | --- | --- |
| FDMA (Frequency Division Multiple Access) | 1 | 30 kHz | 7 |
| TDMA (Time Division Multiple Access) | Up to 3 | 30 kHz | 7 |
| GSM (Global System for Mobile Communications) | Up to 8 | 200 kHz | 4 |
| CDMA (Code Division Multiple Access) | 13 to 28+ | 1.25 mHz | 1 |

Figure 4:
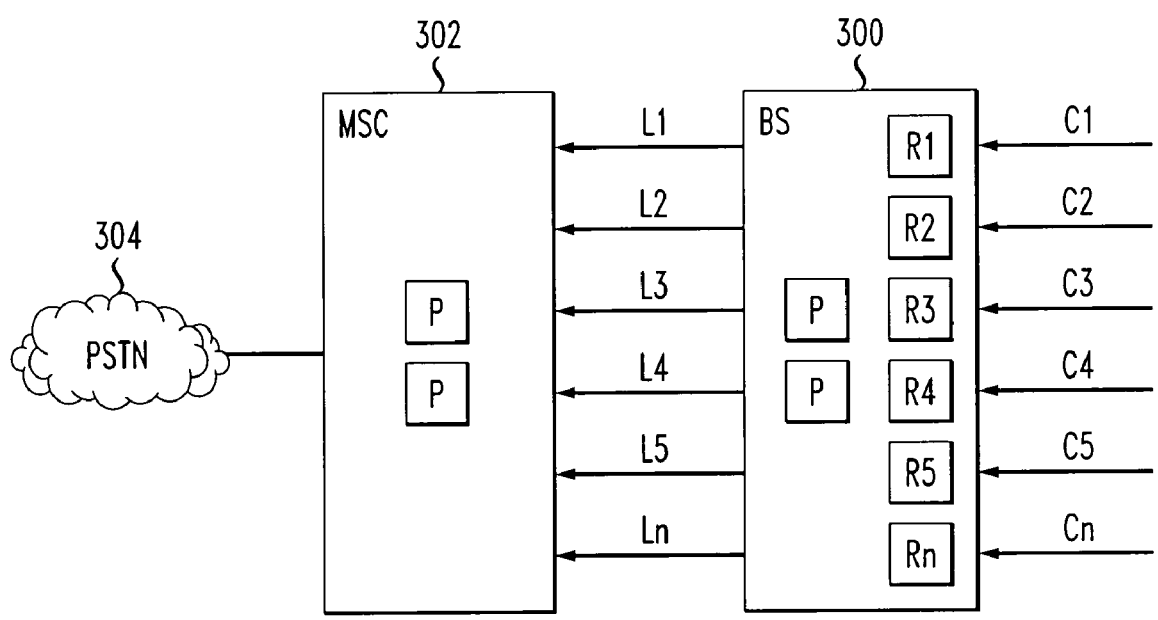
FIG. 4 is a block diagram of a conventional system for receiving and transmitting cellular radio signals in a cellular radio network.

A typical base station 300 is illustrated in FIG. 4. A plurality of channels C1, C2, C3 . . . Cn is linked to the base station 300. For each channel C1, C2, C3 . . . Cn there is a corresponding radio receiver R1, R2, R3 . . . Rn for receiving the communication on the channel. The base station 300 also includes a plurality of logical processors P for processing the traffic being sent on the channels C to the corresponding receivers R. Further, each channel C has a corresponding physical link L1, L2, L3 . . . Ln to a mobile switching center (MSC) 302. In short, at present, there is a dedicated receiver, processing logic, and a link for each incoming signal. In a cellular radio network, the MSC acts as an interface between the radio network and the public switched telephone network (PSTN) 304. The MSC performs all signaling functions that are necessary to establish calls to and from mobile subscriber units. The mobile switching center 302 includes a plurality of logical processors P for processing the signals received from the base station 300. Such processing, which is known in the art, may include encryption/decryption, code processing for CDMA, billing information, handoffs, registration, etc. The mobile switching center 302 also includes means for routing the signals to the PSTN 304. However, it is costly to set up and maintain such a base station, which has many receivers R and links L to the mobile switching center 302.

Figure 5:
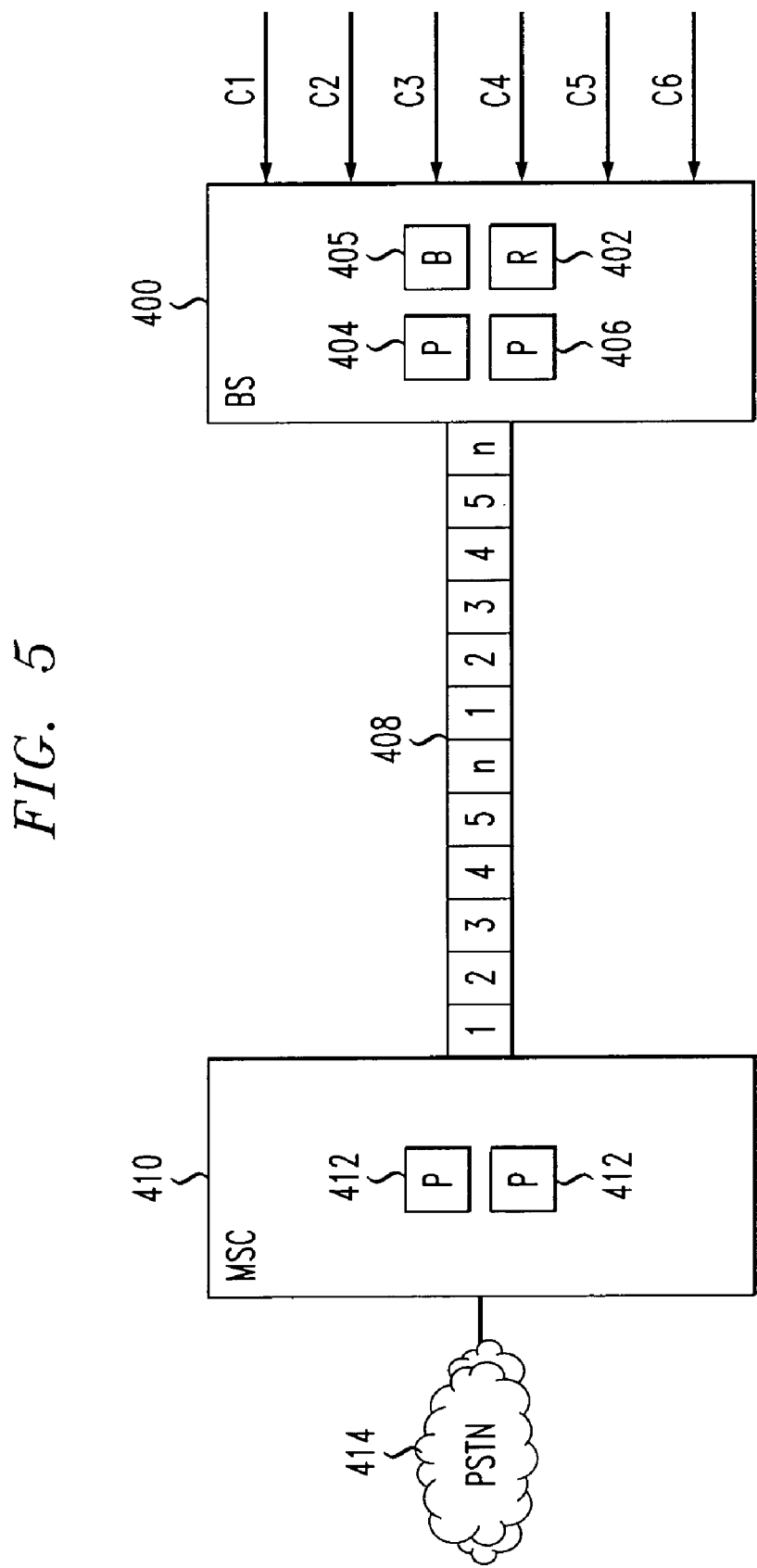
FIG. 5 is a block diagram of a system for receiving and transmitting cellular radio signals in a cellular radio network according to the present invention.

An exemplary embodiment of the invention is illustrated in FIG. 5. A plurality of channels C1, C2, C3 ... Cn is linked to a base station 400. However, only a single receiver 402 is needed to receive all of the channels, although additional receivers may be provided for backup. A pair of processors 404, 406 are included for processing the traffic being sent on the channels C to the corresponding receivers R as well as for time-multiplexing the signals to the base station 400, although only a single processor may be necessary in some instances. Preferably, the first processor 404 continuously scans all of the allowed channels C and sends the incoming signals to a buffer 405. The second processor 406 then processes all of the buffered signals from the channels. That is, the second processor 406 acts as a multiplexer. In essence, multiple data streams—in this case, the channels—are put into a single signal by separating the signal into many segments, each having a very short duration. The segments are assigned to the composite signal in a rotating, repeating sequence. As long as the speed of the processors 404, 406 is faster than the multiplication of the number of channels C and the channel bandwidth, no signals would be missed. The maximum bandwidth in present-day technologies (refer to Table 1) is only 1.25 mHz, whereas present-day processors have a speed in the range of 3 gHz. In other words, a present-day processor can scan more than a thousand channels without losing any data, which is many times more than the numbers of channels per base station. Thus, a processor can easily scan all channels received on a single radio receiver without losing any incoming signal.

Accordingly, only one physical link 408 is needed to send the data, which has been time-multiplexed, to a mobile switching center 410. A similar process at the mobile switching center 410, which may include at least one processor 412 for processing the signals received from the base station 400. Such processing may include encryption/decryption, code processing for CDMA, billing information, handoffs, and registration. The processor 412 may also include computer software for the purpose of demultiplexing the incoming signal from the base station 400 by any known means in the art. Thus, the processor 412 may operate to remove and separate the data corresponding to different channels and then route the channels to the PSTN 414.

Figure 6:
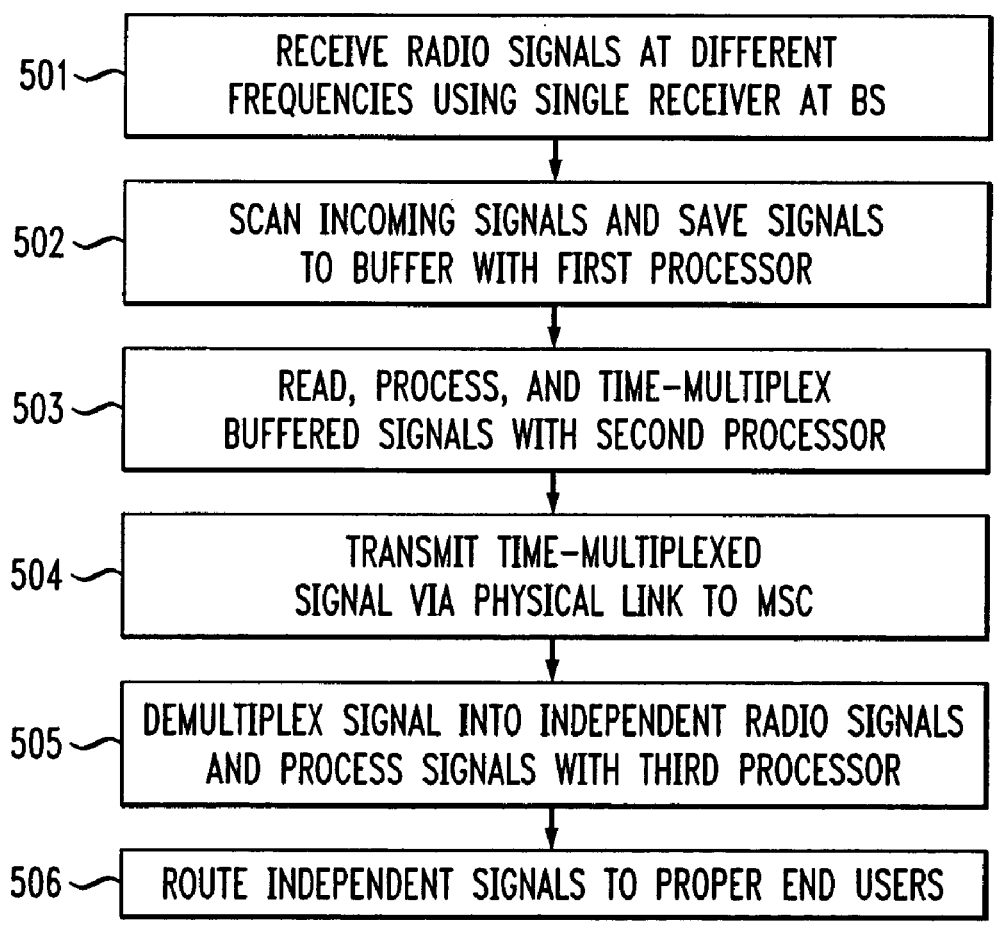
FIG. 6 is flow chart illustrating a preferred embodiment of a method for receiving and transmitting signals in a radio cellular network according to the present invention.

FIG. 6 is a flow chart illustrating a preferred embodiment of a method for receiving and transmitting signals in a radio cellular network according to the present invention. The method of FIG. 6 is described with respect to FIG. 5.

The method includes receiving a plurality of radio signals at different frequencies using a single receiver (radio receiver) 402 at the base station 400 (Step 501). A fast set of processors 404, 406 at the base station 400 scans all incoming frequencies and time-multiplexes them before transmitting a single time-multiplexed signal over a single link to the mobile switching center 410. From an implementation perspective, it is to be understood by those skilled in the art that a single processor could accomplish the task of looping though all incoming channels, time-multiplexing them, and then serializing them over a single link to the mobile switching center. However, a preferred implementation would be to use two processors. Thus, the first processor 404 would scan incoming signals and save them to the buffer 405 (Step 502). The second processor 406 would then read these buffered signals, do the required processing of each signal and time-multiplex them (Step 503) before sending the resulting signal over a single link 408 to the MSC 410 (Step 504). Regardless of the implementation, the reverse processing will be done at the MSC 410 by means of one or more processors 412, where the process preferably includes retrieving the independent signals from the time-multiplexed signal (de-multiplexing) and processing each signal (Step 505) before sending the independent signals to their the proper destination (Step 506).

Accordingly, by reducing the number of receivers needed in the base station to a single receiver and by reducing the number of links needed from the base station to the mobile switching center to a single link, the costs associated with building and maintaining the base stations will be reduced for the service providers.

The invention has been described as a reference to the preferred embodiments. Obviously, modifications and alterations will occur to others upon reading an understanding the preceding detailed description. It is intended that the invention be construed as including all such modifications and alterations insofar as they come within the scope of the appended claims or the equivalents thereof.

What is claimed is:

1. In a cellular radio network having a plurality of base stations and a mobile switching center, a method for receiving and transmitting signals, the method comprising:

receiving a plurality of radio signals on a plurality of channels using a single radio receiver at said base station, wherein each of said channels has a channel bandwidth;

continuously scanning said incoming signals and saving said signals to a buffer with a first processor;

reading, processing and time-multiplexing said buffered signals with a second processor, wherein the speed of said first and second processors is faster than the multiplication of the number of channels and the channel bandwidths;

transmitting said time-multiplexed radio signal via a single physical link to a mobile switching center;

demultiplexing said time-multiplexed radio signal into independent radio signals corresponding to said incoming signals at said mobile switching center with a third processor;

processing said independent radio signals with said third processor; and routing said independent radio signals to the proper end users.

2. The method defined in claim 1, wherein said cellular radio network comprises a Frequency Division Multiple Access network.

3. The method defined in claim 1, wherein said cellular radio network comprises a Time Division Multiple Access network.

4. The method defined in claim 1, wherein said cellular radio network comprises a Global System for Mobile Communications.

5. The method defined in claim 1, wherein said cellular radio network comprises a Code Division Multiple Access network.

6. A system for receiving and transmitting cellular radio signals in a cellular radio network, the system comprising:

a radio receiver at a base station for receiving a plurality of radio signals on a plurality of channels, wherein each of said channels has a channel bandwidth;

a first processor for continuously scanning said incoming signals and saving said signals to a buffer;

a second processor for reading, processing and time-multiplexing said buffered signals, wherein the speed of said first and second processors is faster than the multiplication of the number of channels and the channel bandwidths;

means for transmitting said time-multiplexed radio signal via a single physical link to a mobile switching center;

a third processor for demultiplexing said time-multiplexed radio signal into independent radio signals corresponding to said incoming signals at said mobile switching center and processing said independent radio signals; and means for routing said independent radio signals to the proper end users.

7. The system defined in claim 6, wherein said cellular radio network comprises a Frequency Division Multiple Access network.

8. The system defined in claim 6, wherein said cellular radio network comprises a Time Division Multiple Access network.

9. The system defined in claim 6, wherein said cellular radio network comprises a Global System for Mobile Communications network.

10. The system defined in claim 6, wherein said cellular radio network comprises a Code Division Multiple Access network.

* * * * *